(12) United States Patent
Nunome et al.

(10) Patent No.: US 7,931,986 B2
(45) Date of Patent: Apr. 26, 2011

(54) ALKALINE BATTERY

(75) Inventors: Jun Nunome, Kyoto (JP); Yuji Mototani, Kyoto (JP)

(73) Assignee: Panasonic Corporation, Osaka (JP)

( * ) Notice: Subject to any disclaimer, the term of this patent is extended or adjusted under 35 U.S.C. 154(b) by 901 days.

(21) Appl. No.: 11/896,817

(22) Filed: Sep. 6, 2007

(65) Prior Publication Data

US 2008/0063938 A1     Mar. 13, 2008

(30) Foreign Application Priority Data

Sep. 7, 2006 (JP) ................................. 2006-242449

(51) Int. Cl.
*H01M 4/50* (2010.01)
(52) U.S. Cl. ...................................................... 429/224
(58) Field of Classification Search .................. None
See application file for complete search history.

(56) References Cited

U.S. PATENT DOCUMENTS 5,283,139 A * 2/1994 Newman et al. .............. 429/224
6,620,550 B2 * 9/2003 Christian et al. .............. 429/224

FOREIGN PATENT DOCUMENTS

JP   2004-186127   7/2004

OTHER PUBLICATIONS

Nagaishi, T. et al., "Electrolysis condition and various characteristics of electrolytic manganese dioxide suitable for high rate discharge performance", The 44th Battery Symposium Abstract Volume, pp. 656-657, Japan, with English Translation, 2003.

* cited by examiner

*Primary Examiner* — Jonathan Crepeau
(74) *Attorney, Agent, or Firm* — McDermott Will & Emery LLP

(57) ABSTRACT

An alkaline battery includes a positive electrode including a positive electrode active material, a negative electrode including a negative electrode active material, and an alkaline electrolyte including potassium hydroxide. The positive electrode active material includes a manganese dioxide powder, and the negative electrode active material includes a zinc powder. In a powder X-ray diffraction pattern of the manganese dioxide powder using CuKα radiation, the diffraction peak attributed to the (110) plane is in the range of 20.5° to 21.7°, and the ratio of the peak intensity of the (130) plane to the peak intensity of the (021) plane: I(130)/I(021) is 0.1 or less.

7 Claims, 1 Drawing Sheet

ALKALINE BATTERY

FIELD OF THE INVENTION

The invention relates to alkaline batteries, and more particularly, to improvements in manganese dioxide powder included in a positive electrode active material for an alkaline battery.

BACKGROUND OF THE INVENTION

Alkaline batteries include a positive electrode including a positive electrode active material, a negative electrode including a negative electrode active material, and an alkaline electrolyte. The positive electrode active material is commonly manganese dioxide, and there have been various improvements in manganese dioxide in order to improve the discharge characteristics of alkaline batteries.

For example, there has been proposed manganese dioxide in which the amount of structural water (crystalline water) contained in the crystal structure thereof is increased. Japanese Laid-Open Patent Publication No. 2004-186127 proposes the use of manganese dioxide the weight of which changes by 2.7% or more upon heating, in particular, at 200 to 400° C. Also, the 44th Denchi Toronkai Koen Yoshi Shu (the 44th Battery Symposium Abstract Volume) (p. 656-657) states that adjusting synthesis conditions changes the crystal structure of manganese dioxide, thereby resulting in an improvement in the heavy-load discharge characteristics of the battery.

However, in the case of conventional manganese dioxide powder, hydrogen ions cannot move sufficiently in the solid phase of manganese dioxide or in the positive electrode material mixture (i.e., outside the solid phase of manganese dioxide). It is thus difficult to obtain sufficient heavy-load discharge characteristics.

Also, even when the ion movement inside the solid phase of manganese dioxide is sufficiently fast, if the ion movement outside the solid phase is insufficient, it is difficult to sufficiently lessen discharge polarization particularly during heavy-load discharge.

BRIEF SUMMARY OF THE INVENTION

The invention relates to an alkaline battery including: a positive electrode including a positive electrode material mixture that includes a positive electrode active material; a negative electrode including a negative electrode active material; and an alkaline electrolyte including potassium hydroxide. The positive electrode active material includes a manganese dioxide powder, and the negative electrode active material includes a zinc powder or zinc alloy powder. In a powder X-ray diffraction pattern of the manganese dioxide powder using CuKα radiation as the X-ray, the diffraction peak attributed to the (110) plane is in the range of 20.5° to 21.7°, and the ratio of the peak intensity of the (130) plane to the peak intensity of the (021) plane: I(130)/I(021) is 0.1 or less.

According to the invention, the moving rate of hydrogen ions inside the solid phase of manganese dioxide appears to become high, and that the ion moving rate inside the positive electrode material mixture also appears to become high. It is believed that the use of such manganese dioxide allows suppression of discharge polarization even upon heavy-load discharge, thereby providing an alkaline battery with good discharge characteristics.

The number basis percentage of particles with particle sizes of 10 to 51 μm contained in the manganese dioxide powder is preferably 58 to 81%.

Also, the density of the manganese dioxide powder in the positive electrode material mixture is preferably 2.75 to 2.92 g/cm$^3$.

Preferably, the positive electrode material mixture includes 5 to 8% by weight of a graphite powder.

The content of the potassium hydroxide in the alkaline electrolyte is preferably 30 to 36% by weight.

The zinc powder or zinc alloy powder preferably includes 20 to 35% by weight of particles with particle sizes of 75 μm or less.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

Figure 1:
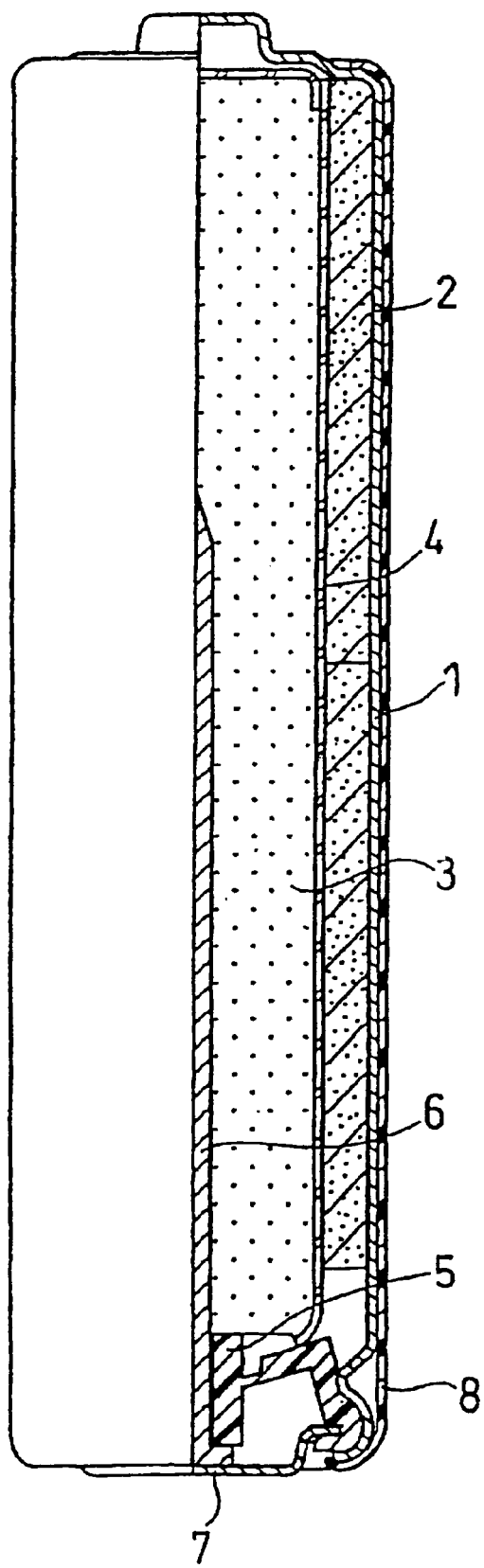
FIG. 1 is a longitudinal sectional view of an alkaline battery according to one embodiment of the invention.

The invention is directed to an alkaline battery that includes a positive electrode, a negative electrode including a negative electrode active material, and an alkaline electrolyte including potassium hydroxide. The positive electrode includes a positive electrode material mixture, and the positive electrode material mixture contains a positive electrode active material. The positive electrode active material includes a manganese dioxide powder, and the negative electrode active material includes a zinc powder or zinc alloy powder.

In the manganese dioxide powder, the diffraction peak attributed to the (110) plane is in the range of 20.5° to 21.7°, and the ratio of the peak intensity of the (130) plane to the peak intensity of the (021) plane: I(130)/I(021) is 0.1 or less, for example, 0.03 to 0.1.

The present inventors have found that the manganese dioxide having the above-described crystal structure has the effect of increasing the moving rate of hydrogen ions inside the solid phase and the ion moving rate inside the positive electrode material mixture (i.e., outside the solid phase of manganese dioxide). The use of such manganese dioxide can provide an alkaline battery having excellent heavy-load discharge characteristics.

If the peak position of the (110) plane is less than 20.5° or greater than 21.7°, the moving rate of hydrogen ions in the solid phase of manganese dioxide becomes insufficient due to undesirable structural asymmetry in the crystal structure.

When the crystal of manganese dioxide grows, inversion of atomic arrangement (microtwinning) occurs in the crystal structure. Structural asymmetry in a crystal structure refers to, for example, a defect of Mn atoms in the asymmetric face (i.e., inverted face) of microtwin.

If the peak intensity ratio: I(130)/I(021) is greater than 0.1, the moving rate of hydrogen ions in the solid phase of manganese dioxide becomes insufficient due to the above-mentioned undesirable structural asymmetry. It is thus difficult to improve the heavy-load discharge characteristics.

The manganese dioxide of the invention has a structure such as gamma or epsilon type, which is a mixed crystal of ramsdellite phase and pyrolusite phase. Also, for example, chemical manganese dioxide (one prepared by chemical synthesis) having a similar crystal structure can be used in the invention.

In the invention, the crystal structure of manganese dioxide power is evaluated by powder X-ray diffraction analysis using CuKα radiation. The following is an example of evaluation methods of manganese dioxide powder according to the invention.

The peak position and peak intensity of manganese dioxide powder can be measured, for example, as follows.

Using, for example, RINT 2000 available from Rigaku Corporation as a measuring instrument, its tube voltage, current, divergence slit, scattering slit, light-receiving slit width, scanning speed, scanning step, scanning axis, etc., are set to make a measurement. With respect to these settings, one with ordinary skill in the art can select appropriate values based on known samples. For example, on the assumption that the basic structure of manganese dioxide is of the ramsdellite type, Miller indices can be assigned to a diffraction line.

Peak intensity (cps) can be determined, for example, by removing the following background from a diffraction image. The background of the peak of the (110) plane is designated as a straight line connecting the diffraction spots at $2\theta=17°$ and $2\theta=29°$. The background of the peaks of the (130) plane and the (021) plane is designated as a straight line connecting the diffraction spots at $2\theta=31.5°$ and $2\theta=41.0°$. If multiple peaks overlap, Pseudo-Voigt function is used for modeling the diffraction line.

Generally, when particle size distribution has a narrow peak width, powder is packed at a low rate, thereby resulting in an increase in porosity. On the other hand, when particle size distribution has a large peak width, the packing of powder may be improved, thereby leading to a decrease in porosity.

The number basis percentage of particles (manganese dioxide particles) with particle sizes of 10 to 51 μm contained in the manganese dioxide powder is preferably 58 to 81%. In this case, since the positive electrode has sufficient pores, the positive electrode can retain a sufficient amount of electrolyte. The number basis percentage of particles with particle sizes of 10 to 51 μm is more preferably 65 to 75%.

If this number basis percentage is less than 58%, the porosity of the positive electrode may become low. A low porosity may result in reductions in the amount of electrolyte retained in the positive electrode and hence ion-moving rate. On the other hand, if the percentage exceeds 81%, the manganese dioxide content in the positive electrode may become relatively low.

As used herein, the number basis percentage of particles with particle sizes of 10 to 51 μm refers to the ratio of the number of manganese dioxide particles with particle sizes of 10 to 51 μm to the total number of manganese dioxide particles in the manganese dioxide powder corresponding to a number basis particle size distribution. The number basis particle size distribution of the manganese dioxide powder can be determined, for example, as follows.

For example, LA-920 available from Horiba, Ltd. is used as the measuring instrument, and pure water is used as the medium in which manganese dioxide particles are to be dispersed. With the circulation speed of the solvent set, and immediately after ultrasonic waves are applied for a predetermined time, a particle size measurement is started. The integration $V_{10}$ of the number basis percentages of particles having particle sizes from the largest down to 10 μm and the integration $V_{51}$ of the number basis percentages of particles having particle sizes from the largest down to 51 μm are obtained. By subtracting $V_{51}$ from $V_{10}$, the desired number basis percentage (i.e., the number basis percentage of particles with particle sizes of 10 to 51 μm) can be determined.

The density of manganese dioxide in the positive electrode material mixture is preferably 2.75 to 2.92 $g/cm^3$. In this case, since the positive electrode has preferable porosity, the positive electrode can retain a sufficient amount of electrolyte. Also, in this density range, a sufficient amount of manganese dioxide powder can be packed in the positive electrode, so excellent discharge characteristics can be obtained. The density of manganese dioxide is more preferably 2.80 to 2.90 $g/cm^3$.

The density of manganese dioxide can be calculated, for example, by using the volume V ($cm^3$) of the positive electrode material mixture of a fabricated battery as a denominator and the weight W (g) of manganese dioxide contained in the positive electrode material mixture as a numerator (i.e., W/V $g/cm^3$).

Manganese dioxide can be prepared, for example, by electrolysis or chemical synthesis. In the case of using electrolysis, the crystal structure of manganese dioxide can be controlled, for example, by adjusting the sulfuric acid concentration in an electrolytic bath, electrolytic temperature, electrolytic current density, etc. Manganese dioxide may be crushed, for example, by a grinder to obtain a powder of a predetermined particle size.

Manganese dioxide of the invention can be used singly, or mixed with other manganese dioxide or the like as long as manganese dioxide having the physical properties of the invention accounts for, for example, 60% by weight or more of the whole positive electrode active material.

The positive electrode material mixture containing the positive electrode active material is described below.

The positive electrode material mixture may contain a conductive agent. The conductive agent is not particularly limited and can be a carbon-type conductive agent such as natural graphite, artificial graphite, expanded graphite, fibrous graphite, acetylene black, or carbon black. Among them, artificial graphite powder is preferably used.

In terms of suppressing the internal resistance of the positive electrode and facilitating the molding of positive electrode pellets, the positive electrode preferably contains 5 to 8% by weight or 6 to 8% by weight of a graphite powder.

The positive electrode material mixture may contain a binder. The binder contained in the positive electrode material mixture improves the moldability of the positive electrode. The binder is not particularly limited and can be, for example, polyethylene or the like.

The negative electrode active material includes a zinc powder or zinc alloy powder. In terms of reducing the degradation of discharge characteristics due to polarization of the negative electrode upon heavy-load discharge, the zinc powder or zinc alloy powder preferably contains 20 to 35% by weight of particles of zinc or zinc alloy with particle sizes of 75 μm or less, preferably 10 to 75 μm. The zinc powder or zinc alloy powder more preferably contains 25 to 30% by weight of such particles.

The negative electrode is a gelled negative electrode composed of a mixture of, for example, a zinc alloy powder, an electrolyte, and a gelling agent. The metal other than zinc contained in the zinc alloy powder is not particularly limited and is preferably a metal that exhibits a low potential in an alkaline aqueous solution, is capable of discharging, and is stable. In terms of enhancing corrosion resistance and stability, metals such as indium, bismuth, aluminum, calcium, barium, magnesium, and strontium may be added to the alloy powder. Also, an organic or inorganic additive may be added to the negative electrode. The gelling agent is not particularly limited and can be, for example, sodium polyacrylate.

The alkaline electrolyte includes potassium hydroxide. The concentration of potassium hydroxide in the alkaline electrolyte is preferably 30 to 36% by weight since the ion movement is facilitated. The concentration is more preferably 32 to 35% by weight.

Preferably, the alkaline electrolyte further includes zinc oxide (ZnO). The ZnO content in the alkaline electrolyte is preferably 1 to 3% by weight. The alkaline electrolyte may further include sodium hydroxide, lithium hydroxide, calcium hydroxide, etc.

The separator material is not particularly limited, and examples include non-woven fabric including alkali-resistant rayon, pulp or the like, non-woven fabric including plastic resin, and porous films.

Referring now to FIG. 1, an alkaline battery according to one embodiment of the invention is described.

FIG. 1 is a partially cross-sectional front view of an alkaline battery. The alkaline battery has a battery case 1, a positive electrode composed of, for example, a plurality of hollow positive electrode material mixture pellets 2 placed inside the battery case 1, a separator 4, and a gelled negative electrode 3.

The positive electrode material mixture pellets 2 are inserted in the battery case 1 and repressed by using a compressing device so that they closely adhere to the inner wall of the battery case 1. The separator 4, which has a cylindrical shape having a bottom, is placed in the space inside the positive electrode material mixture pellets 2 in the battery case 1, and a predetermined amount of an alkaline electrolyte is injected into the space inside the separator 4. After a predetermined time, the gelled negative electrode 3 is charged into the space inside the separator 4.

A negative electrode current collector 6 is inserted in the middle of the gelled negative electrode 3. The negative electrode current collector 6 is previously integrated with a gasket 5 and a bottom plate 7. The bottom plate 7 serves as the negative electrode terminal. The open edge of the battery case 1 is crimped onto the circumference of the bottom plate 7 with the edge of the gasket 5 interposed therebetween, to seal the opening of the battery case 1. Lastly, the outer surface of the battery case 1 is covered with an outer label 8. In this way, an alkaline battery is completed.

The material of the battery case 1 is not particularly limited and can be, for example, iron with plating. The size and shape of the alkaline battery is also not particularly limited. For example, the battery may be cylindrical or prismatic. In particular, the invention can be effectively applied to an LR6-type cylindrical battery since it is often used in applications that require heavy-load discharge.

The invention is hereinafter described more specifically by way of Examples.

EXAMPLE 1

(1) Preparation of Manganese Dioxide Powder

An anode was placed in the middle of an electrolytic cell, and two cathodes were placed on both sides of the anode at a distance of 2 cm between each cathode and the anode. A round-bottomed, separable flask with a volume of 2 L was used as the electrolytic cell. A 1-mm thick titanium plate of 5 cm×5 cm was used as the anode. A 0.2-mm thick platinum plate of 5 cm×5 cm was used as the cathode. An aqueous solution was prepared by mixing manganese sulfate with sulfuric acid such that the manganese sulfate concentration was 50 g/L and the sulfuric acid concentration was 90 g/L, and this aqueous solution was used as the electrolytic bath.

The manganese sulfate and sulfuric acid used were guaranteed grade products of Kanto Chemical Co., Inc. In consideration of a change due to electrolytic reaction, the aqueous solution of manganese sulfate was added to the electrolytic cell such that the manganese ion concentration and the sulfuric acid concentration were always within ±7% with respect to the initial values. The temperature of the electrolytic bath was 95° C.±1.0° C. The temperature was adjusted by a mantle heater. Electrolysis was continuously performed at an electrolytic current density of 35 A/m$^2$ for 24 hours.

After the completion of the electrolysis, electrodeposited manganese dioxide was removed from the anode plate and coarsely crushed to 250 μm or less. The resultant powder of 10 g was placed into 100 mL of ion-exchange water, which was then stirred, with a 0.1 N sodium hydroxide aqueous solution added dropwise, until pH 6 was reached. In this way, a neutralized slurry was obtained.

The slurry was filtered with a Buchner funnel, and the deposit was washed by further passing 100 mL of ion-exchange water through the funnel. The washed deposit was dried at 90° C. for 2 hours to obtain a powder. The powder was crushed by a stamping mill.

The particle size distribution of the manganese dioxide powder was adjusted by classifying the crushed powder by using JIS sieves and adjusting the mixing ratio of the classified particles of respective particle sizes in all examples and comparative examples.

In this way, a manganese dioxide powder was prepared.

The manganese dioxide powder was subjected to a powder X-ray diffraction measurement by using RINT 2000 available from Rigaku Corporation under the following conditions.

X-ray radiation source: CuKα1 (wavelength 1.5405 Å)
Tube voltage: 40 kV
Current: 150 mA
Divergence slit: 0.5°
Scattering slit: 0.5°
Light-receiving slit width: 0.3 mm
Scanning speed: 2°/min
Scanning step: 0.05°
Scanning axis: 2θ/θ

A monochrometer was used as a detector. On the assumption that the basic structure of manganese dioxide is of the ramsdellite type, Miller indices were assigned to the diffraction line. That is, the peak at 2θ=21.0 to 22.5° was designated as the peak of the (110) plane, the peak at 2θ=33.0 to 36.5° as the peak of the (130) plane, and the peak at 2θ=36.8 to 37.5° as the peak of the (021) plane.

Peak intensity (cps) was determined by removing the following background from the measured diffraction image. The background of the peak of the (110) plane was designated as a straight line connecting the diffraction spots at 2θ=17° and 2θ=29°. The background of the peaks of the (130) plane and the (021) plane was designated as a straight line connecting the diffraction spots at 2θ=31.5° and 2θ=41.0°. When multiple peaks overlapped, Pseudo-Voigt function was used for modeling the diffraction line.

The diffraction peak attributed to the (110) plane was 20.5°.

The ratio of the peak intensity of the (130) plane to the peak intensity of the (021) plane: I(130)/I(021) was 0.02.

The number basis percentage of particles with particle sizes of 10 to 51 μm contained in the manganese dioxide powder was determined under the following conditions.

As the measuring instrument, LA-920 available from Horiba, Ltd. was used. Also, pure water was used as the medium in which the manganese dioxide particles were to be dispersed. The circulation speed of the medium was set to level 15 and the ultrasonic waves were set to level 3. Immediately after ultrasonic waves were applied for 30 seconds, a particles size measurement was started. The integration of the number basis percentages of particles having particle sizes from the largest down to 51 µm was subtracted from the integration of the number basis percentages of particles having particle sizes from the largest down to 10 µm, and the resultant value was expressed as a percentage relative to the total number of particles. The number basis percentage of particles having particle sizes of 10 µm to 51 µm contained in the manganese dioxide powder was 65%.

(2) Preparation of Positive Electrode Material Mixture

A positive electrode material mixture was prepared by mixing the manganese dioxide powder, artificial graphite (SP20 available from Nippon Graphite Industries, Ltd.), and an aqueous solution containing 34% by weight of potassium hydroxide with a mixer. The content of the artificial graphite in the positive electrode material mixture was 7% by weight. The content of the potassium hydroxide aqueous solution was 1% by weight of the manganese dioxide powder.

(3) Preparation of Positive Electrode Pellet

The positive electrode material mixture was molded under pressure into the shape of a hollow cylinder (donut) by using a mold. The pressure applied was adjusted such that the density of the manganese dioxide powder in the pellet was 2.82 g/cm$^3$. The density of the manganese dioxide powder was calculated by using the volume of the positive electrode material mixture when a battery was fabricated as described below as a denominator and the weight of the manganese dioxide contained in the positive electrode material mixture as a numerator.

(4) Preparation of Gelled Negative Electrode

A gelled electrolyte was prepared by mixing an electrolyte and a sodium polyacrylate gelling agent in a weight ratio of 100:3. A gelled negative electrode was prepared by mixing the gelled electrolyte and a zinc alloy powder in a weight ratio of 1:2. In the zinc alloy powder used, the ratio of zinc alloy particles with particle sizes of 75 µm or less to the whole zinc alloy particles was 27% by weight. The electrolyte used was an alkaline aqueous solution having a potassium hydroxide concentration of 34% by weight and containing 2.5% by weight of zinc oxide.

(5) Fabrication of Alkaline Battery

An AA alkaline battery as illustrated in FIG. 1 was produced in the following manner.

Two positive electrode material mixture pellets 2 were placed in a battery case 1 and repressed by using a compressing device so that they closely adhered to the inner wall of the battery case 1. A separator 4, having a cylindrical shape with a bottom, was placed in the space inside the positive electrode material mixture pellets 2 in the battery case 1, and a predetermined amount of an electrolyte was injected into the space inside the separator 4. This electrolyte had a potassium hydroxide concentration of 34% by weight and contained 2.5% by weight of zinc oxide. After a predetermined time, a gelled negative electrode 3 prepared in the above manner was charged into the space inside the separator 4. The separator 4 used was a non-woven fabric composed mainly of polyvinyl alcohol fiber and rayon fiber.

A negative electrode current collector 6 was inserted in the middle of the gelled negative electrode 3. The negative electrode current collector 6 had been previously integrated with a gasket 5 and a bottom plate 7. The bottom plate 7 serves as the negative electrode terminal. The open edge of the battery case 1 was crimped onto the circumference of the bottom plate 7 with the edge of the gasket 5 interposed therebetween, to seal the opening of the battery case 1. Lastly, the outer surface of the battery case 1 was covered with an outer label 8. In this way, the alkaline battery is completed.

EXAMPLE 2

An alkaline battery was produced in the same manner as in Example 1, except that in the preparation of a manganese dioxide powder, the sulfuric acid concentration in the electrolytic bath was set to 75 g/L.

EXAMPLE 3

An alkaline battery was produced in the same manner as in Example 1, except that in the preparation of a manganese dioxide powder, the sulfuric acid concentration in the electrolytic bath was set to 50 g/L, and that the electrolytic current density was set to 50 A/m$^2$.

EXAMPLE 4

An alkaline battery was produced in the same manner as in Example 1, except that in the preparation of a manganese dioxide powder, the sulfuric acid concentration in the electrolytic bath was set to 50 g/L, and that the electrolytic current density was set to 45 A/m$^2$.

EXAMPLE 5

An alkaline battery was produced in the same manner as in Example 1, except that in the preparation of a manganese dioxide powder, the sulfuric acid concentration in the electrolytic bath was set to 60 g/L, and that the electrolytic current density was set to 40 A/m$^2$.

EXAMPLE 6

An alkaline battery was produced in the same manner as in Example 1, except that in the preparation of a manganese dioxide powder, the sulfuric acid concentration in the electrolytic bath was set to 50 g/L, that the temperature of the electrolytic bath was set to 92° C., and that the electrolytic current density was set to 40 A/m$^2$.

COMPARATIVE EXAMPLE 1

An alkaline battery was produced in the same manner as in Example 1, except that in the preparation of a manganese dioxide powder, the sulfuric acid concentration in the electrolytic bath was set to 100 g/L, and that the electrolytic current density was set to 50 A/m$^2$.

COMPARATIVE EXAMPLE 2

An alkaline battery was produced in the same manner as in Example 1, except that in the preparation of a manganese dioxide powder, the sulfuric acid concentration in the electrolytic bath was set to 40 g/L, that the temperature of the electrolytic bath was set to 92° C., and that the electrolytic current density was set to 45 A/m$^2$.

(6) Evaluation of Heavy-Load Discharge Characteristics

The alkaline batteries produced in Examples 1 to 6 and Comparative Examples 1 to 2 were evaluated for their heavy-load discharge performance. The alkaline batteries were left at room temperature for 10 days and subjected to the following discharge pattern in an environment at 20° C. That is, a cycle of discharging at 1500 mW for 2 seconds and at 600 mW for 28 seconds was repeated 10 times (5 minutes) and the discharge was then stopped for 55 minutes. This 1-hour discharge pattern was repeated to measure the time it took until the lower-limit voltage reached 1.05 V. The heavy-load discharge performance was expressed as a relative value with respect to the performance of Comparative Example 2 (battery using conventional manganese dioxide), which was defined as 100. Table 1 shows the results together with production conditions of manganese dioxide and the results of X-ray diffraction analyses.

dioxide powder, the number basis percentage of particles with particle sizes of 10 μm to 51 μm was set to 81%.

EXAMPLE 11

An alkaline battery was produced in the same manner as in Example 3, except that in the preparation of a manganese dioxide powder, the number basis percentage of particles with particle sizes of 10 μm to 51 μm was set to 52%.

TABLE 1

| | Sulfuric acid concentration in electrolytic bath (g/L) | Temperature of electrolytic bath (° C.) | Electrolytic current density (A/m$^2$) | Diffraction peak attributed to (110) plane (°) | Intensity ratio I(130)/I(021) | Heavy load discharge performance |
|---|---|---|---|---|---|---|
| Example 1 | 90 | 95 | 35 | 20.5 | 0.02 | 111 |
| Example 2 | 75 | 95 | 45 | 20.7 | 0.04 | 118 |
| Example 3 | 50 | 95 | 50 | 21.0 | 0.05 | 123 |
| Example 4 | 50 | 95 | 45 | 21.2 | 0.06 | 120 |
| Example 5 | 60 | 95 | 40 | 21.5 | 0.08 | 116 |
| Example 6 | 50 | 92 | 40 | 21.7 | 0.10 | 111 |
| Com. Ex. 1 | 100 | 95 | 50 | 20.1 | 0.03 | 99 |
| Com. Ex. 2 | 40 | 92 | 50 | 21.9 | 0.20 | 100 |

The results of Table 1 have shown that the use of manganese dioxide having a diffraction peak attributed to the (110) plane in the range of 20.5° to 21.7° and a peak intensity ratio I(130)/I(021) of 0.1 or less in a CuKα powder X-ray diffraction pattern can provide alkaline batteries with excellent heavy-load discharge performance.

Since such manganese dioxide has a controlled crystal structure, the ion moving rate inside the solid phase of manganese dioxide during heavy-load discharge is high. Probably for this reason, discharge polarization was suppressed.

In the pulse discharge pattern performed to evaluate the heavy-load discharge performance, when the performance was improved by 10% or more with respect to the battery of Comparative Example 2, this was judged clearly effective.

EXAMPLE 7

An alkaline battery was produced in the same manner as in Example 3, except that in the preparation of a manganese dioxide powder, the number basis percentage of particles with particle sizes of 10 μm to 51 μm was set to 58%.

EXAMPLE 8

An alkaline battery was produced in the same manner as in Example 3, except that in the preparation of a manganese dioxide powder, the number basis percentage of particles with particle sizes of 10 μm to 51 μm was set to 61%.

EXAMPLE 9

An alkaline battery was produced in the same manner as in Example 3, except that in the preparation of a manganese dioxide powder, the number basis percentage of particles with particle sizes of 10 μm to 51 μm was set to 75%.

EXAMPLE 10

An alkaline battery was produced in the same manner as in Example 3, except that in the preparation of a manganese

EXAMPLE 12

An alkaline battery was produced in the same manner as in Example 3, except that in the preparation of a manganese dioxide powder, the number basis percentage of particles with particle sizes of 10 μm to 51 μm was set to 86%.

The alkaline batteries produced in Examples 7 to 12 were evaluated for their heavy-load discharge performance in the same manner as described above. Table 2 shows the results.

TABLE 2

| | Number basis percentage of particles of 10 to 51 μm (%) | Heavy load discharge performance |
|---|---|---|
| Example 7 | 58 | 118 |
| Example 8 | 61 | 119 |
| Example 3 | 65 | 123 |
| Example 9 | 75 | 121 |
| Example 10 | 81 | 120 |
| Example 11 | 52 | 111 |
| Example 12 | 86 | 110 |

In these Examples, the number basis percentage of particles with particle sizes of 10 μm to 51 μm in a manganese dioxide powder was examined. The results of Table 2 have demonstrated that the use of a manganese dioxide powder in which the number basis percentage of particles with particle sizes of 10 μm to 51 μm is 58 to 81% can provide alkaline batteries having particularly excellent heavy-load discharge performance. When the number basis percentage is in this range, the positive electrode has sufficient pores, so that a sufficient amount of electrolyte is retained in the positive electrode. As a result, the ion moving rate inside the positive electrode material mixture becomes high and discharge polarization is suppressed. Probably for this reason, the heavy-load discharge performance was improved.

When the number basis percentage is lower than this range, the positive electrode does not have sufficient pores and the electrolyte is not sufficiently retained. Probably for this reason, the heavy-load discharge characteristics lowered slightly.

Also, when the number basis percentage is higher than this range, the amount of manganese dioxide contained in the positive electrode decreases relatively. Probably for this reason, the heavy-load discharge characteristics degraded slightly.

EXAMPLE 13

An alkaline battery was produced in the same manner as in Example 3, except that the content of artificial graphite in the positive electrode material mixture was set to 3% by weight.

EXAMPLE 14

An alkaline battery was produced in the same manner as in Example 3, except that the content of artificial graphite in the positive electrode material mixture was set to 5% by weight.

EXAMPLE 15

An alkaline battery was produced in the same manner as in Example 3, except that the content of artificial graphite in the positive electrode material mixture was set to 8% by weight.

EXAMPLE 16

An alkaline battery was produced in the same manner as in Example 3, except that the content of artificial graphite in the positive electrode material mixture was set to 10% by weight.

The alkaline batteries produced in Examples 13 to 16 were evaluated for their heavy-load discharge performance in the same manner as described above. Table 3 shows the results.

TABLE 3

|  | Content of graphite powder (wt %) | Heavy load discharge performance |
|---|---|---|
| Example 13 | 3 | 113 |
| Example 14 | 5 | 120 |
| Example 3 | 7 | 123 |
| Example 15 | 8 | 122 |
| Example 16 | 10 | 112 |

In these Examples, the content of graphite powder in the positive electrode material mixture was examined. As shown in Table 3, when the positive electrode material mixture contains 5 to 8% by weight of graphite powder, the heavy-load discharge performance was further improved. When the content of graphite powder in the positive electrode material mixture is 5 to 8% by weight, the internal resistance of the positive electrode is suppressed. Probably for this reason, the heavy-load discharge performance was improved.

EXAMPLE 17

An alkaline battery was produced in the same manner as in Example 3, except that the density of the manganese dioxide powder in the pellets was set to 2.73 g/cm$^3$ by adjusting the pressure applied to the positive electrode material mixture to mold it into pellets under pressure.

EXAMPLE 18

An alkaline battery was produced in the same manner as in Example 3, except that the density of the manganese dioxide powder in the pellets was set to 2.75 g/cm$^3$ by adjusting the pressure applied to the positive electrode material mixture to mold it into pellets under pressure.

EXAMPLE 19

An alkaline battery was produced in the same manner as in Example 3, except that the density of the manganese dioxide powder in the pellets was set to 2.87 g/cm$^3$ by adjusting the pressure applied to the positive electrode material mixture to mold it into pellets under pressure.

EXAMPLE 20

An alkaline battery was produced in the same manner as in Example 3, except that the density of the manganese dioxide powder in the pellets was set to 2.92 g/cm$^3$ by adjusting the pressure applied to the positive electrode material mixture to mold it into pellets under pressure.

EXAMPLE 21

An alkaline battery was produced in the same manner as in Example 3, except that the density of the manganese dioxide powder in the pellets was set to 2.95 g/cm$^3$ by adjusting the pressure applied to the positive electrode material mixture to mold it into pellets under pressure.

The alkaline batteries produced in Examples 17 to 21 were evaluated for their heavy-load discharge performance in the same manner as described above. Table 4 shows the results.

TABLE 4

|  | Density (g/cc) | Heavy load discharge performance |
|---|---|---|
| Example 17 | 2.73 | 112 |
| Example 18 | 2.75 | 121 |
| Example 3 | 2.82 | 123 |
| Example 19 | 2.87 | 123 |
| Example 20 | 2.92 | 117 |
| Example 21 | 2.95 | 113 |

In these Examples, the density of the manganese dioxide powder in the positive electrode material mixture was examined. As shown in Table 4, when the density of the manganese dioxide powder in the positive electrode material mixture is 2.75 to 2.92 g/cm$^3$, alkaline batteries having particularly excellent heavy-load discharge performance were obtained. When the density of the manganese dioxide powder is 2.75 g/cm$^3$ or more, a sufficient amount of manganese dioxide is charged into the positive electrode material mixture. On the other hand, when it is 2.92 g/cm$^3$ or less, the porosity of the positive electrode is optimized and sufficient electrolyte can be retained. Probably for this reason, the heavy-load discharge performance was improved.

EXAMPLE 22

An alkaline battery was produced in the same manner as in Example 3, except that the potassium hydroxide concentration in the electrolyte was set to 28% by weight.

EXAMPLE 23

An alkaline battery was produced in the same manner as in Example 3, except that the potassium hydroxide concentration in the electrolyte was set to 30% by weight.

EXAMPLE 24

An alkaline battery was produced in the same manner as in Example 3, except that the potassium hydroxide concentration in the electrolyte was set to 36% by weight.

EXAMPLE 25

An alkaline battery was produced in the same manner as in Example 3, except that the potassium hydroxide concentration in the electrolyte was set to 38% by weight.

The alkaline batteries produced in Examples 22 to 25 were evaluated for their heavy-load discharge performance in the same manner as described above. Table 5 shows the results.

TABLE 5

| | KOH concentration (wt %) | Heavy load discharge performance |
|---|---|---|
| Example 22 | 28 | 113 |
| Example 23 | 30 | 122 |
| Example 3 | 34 | 123 |
| Example 24 | 36 | 121 |
| Example 25 | 38 | 114 |

In these Examples, the concentration of potassium hydroxide in the alkaline electrolyte was examined. The results of Table 5 have indicated that when the potassium hydroxide concentration in the electrolyte is 30% by weight or more and 36% by weight or less, alkaline batteries having particularly excellent heavy-load discharge performance can be obtained. It is thought that both when the potassium hydroxide concentration is less than 30% by weight and when it is more than 36% by weight, the ion mobility in the electrolyte decreases, thereby resulting in degradation of heavy-load discharge performance.

EXAMPLE 26

An alkaline battery was produced in the same manner as in Example 3, except that the ratio of zinc alloy particles with particle sizes of 75 μm or less to the whole zinc alloy particles was set to 15% by weight.

EXAMPLE 27

An alkaline battery was produced in the same manner as in Example 3, except that the ratio of zinc alloy particles with particle sizes of 75 μm or less to the whole zinc alloy particles was set to 20% by weight.

EXAMPLE 28

An alkaline battery was produced in the same manner as in Example 3, except that the ratio of zinc alloy particles with particle sizes of 75 μm or less to the whole zinc alloy particles was set to 24% by weight.

EXAMPLE 29

An alkaline battery was produced in the same manner as in Example 3, except that the ratio of zinc alloy particles with particle sizes of 75 μm or less to the whole zinc alloy particles was set to 35% by weight.

EXAMPLE 30

An alkaline battery was produced in the same manner as in Example 3, except that the ratio of zinc alloy particles with particle sizes of 75 μm or less to the whole zinc alloy particles was set to 40% by weight.

The alkaline batteries produced in Examples 26 to 30 were evaluated for their heavy-load discharge performance in the same manner as described above. Table 6 shows the results.

TABLE 6

| | Content of particles with particle sizes of 75 μm or less (wt %) | Heavy load discharge performance |
|---|---|---|
| Example 26 | 15 | 113 |
| Example 27 | 20 | 118 |
| Example 28 | 24 | 121 |
| Example 3 | 27 | 123 |
| Example 29 | 35 | 118 |
| Example 30 | 40 | 112 |

In these Examples, the ratio of zinc alloy particles with particle sizes of 75 μm or less contained in the zinc alloy powder of the negative electrode was examined. The results of Table 6 have shown that when the ratio of zinc alloy particles with particle sizes of 75 μm or less contained in the zinc alloy powder of the negative electrode is 20% by weight or more and 35% by weight or less, alkaline batteries having particularly excellent heavy-load discharge performance can be obtained. It is believed that if the ratio is less than 20% by weight, the surface area of the zinc alloy is small, thereby resulting in degradation of heavy-load discharge performance. It is thought that if it is more than 35% by weight, the production of zinc oxide layer on the zinc alloy particles and hence the electronic resistance increase, thereby resulting in degradation of heavy-load discharge performance.

EXAMPLE 31

A positive electrode active material was prepared by mixing a manganese dioxide powder of the invention (manganese dioxide powder used in Example 3) and a conventional manganese dioxide powder (manganese dioxide powder used in Comparative Example 2) in a weight ratio of 1:1. An alkaline battery was produced in the same manner as in Example 3 except for the use of this positive electrode active material.

The heavy-load discharge performance of the battery of Example 31 was 115. This indicates that the manganese dioxide powder of the invention produces an excellent effect when it is used not only singly but also in combination with other active material(s).

In the foregoing Examples, the use of electrolytic manganese dioxide has been shown, but it has been confirmed that the use of chemically synthesized manganese dioxide can also produce essentially the same effect.

According to one embodiment of the invention, discharge polarization is suppressed and it is thus possible to provide an alkaline battery having excellent heavy-load discharge characteristics. Since the alkaline battery of the invention has excellent heavy-load discharge characteristics, it can be used preferably in devices that require large current, such as digital cameras.

Although the invention has been described in terms of the presently preferred embodiments, it is to be understood that such disclosure is not to be interpreted as limiting. Various alterations and modifications will no doubt become apparent to those skilled in the art to which the invention pertains, after having read the above disclosure. Accordingly, it is intended that the appended claims be interpreted as covering all alterations and modifications as fall within the true spirit and scope of the invention.

The invention claimed is:

1. An alkaline battery comprising:
   a positive electrode comprising a positive electrode material mixture including a positive electrode active material;
   a negative electrode comprising a negative electrode active material; and
   an alkaline electrolyte comprising potassium hydroxide,
   wherein said positive electrode active material comprises a manganese dioxide powder,
   said negative electrode active material comprises a zinc powder or zinc alloy powder, and
   in a powder X-ray diffraction pattern of said manganese dioxide powder using CuKα radiation, the diffraction peak attributed to the (110) plane is in the range of 20.7° to 21.5°, and the ratio of the peak intensity of the (130) plane to the peak intensity of the (021) plane: I(130)/I(021) is 0.1 or less.

2. The alkaline battery in accordance with claim 1, wherein the number basis percentage of particles with particle sizes of 10 to 51 μm contained in said manganese dioxide powder is 58 to 81%.

3. The alkaline battery in accordance with claim 1, wherein the density of said manganese dioxide powder in said positive electrode material mixture is 2.75 to 2.92 g/cm$^3$.

4. The alkaline battery in accordance with claim 1, wherein said positive electrode material mixture includes 5 to 8% by weight of a graphite powder.

5. The alkaline battery in accordance with claim 1, wherein the content of said potassium hydroxide in said alkaline electrolyte is 30 to 36% by weight.

6. The alkaline battery in accordance with claim 1, wherein said zinc powder or zinc alloy powder includes 20 to 35% by weight of particles with particle sizes of 75 μm or less.

7. The alkaline battery in accordance with claim 1, wherein the ratio of the peak intensity of the (130) plane to the peak intensity of the (021) plane: I(130)/I(021) is 0.04 to 0.08.

* * * * *